Jan. 27, 1953   A. WEAVER   2,626,994
MULTIPLEX TELEGRAPH SYSTEM
Filed Nov. 19, 1949   8 Sheets-Sheet 1
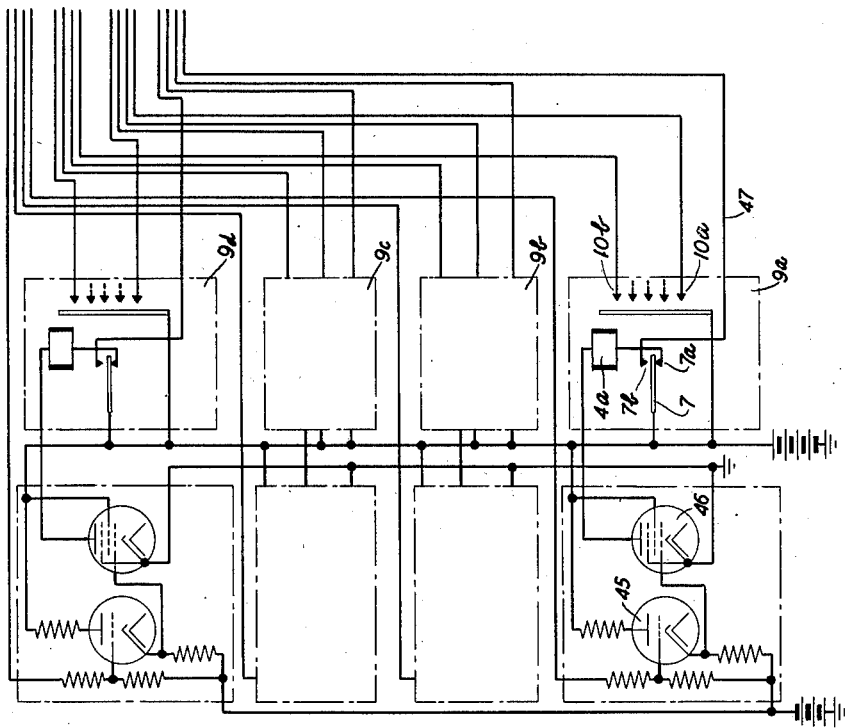
FIG. 2
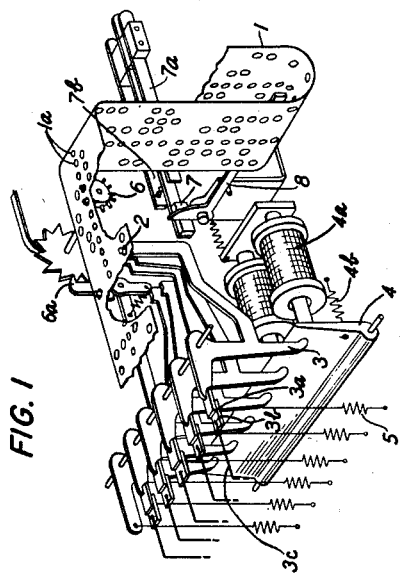
FIG. 1
| FIG. 2 | FIG. 3 | FIG. 4 | FIG. 5 | FIG. 6 |
FIG. 8
INVENTOR
A. WEAVER
BY
J. W. Schmied
ATTORNEY

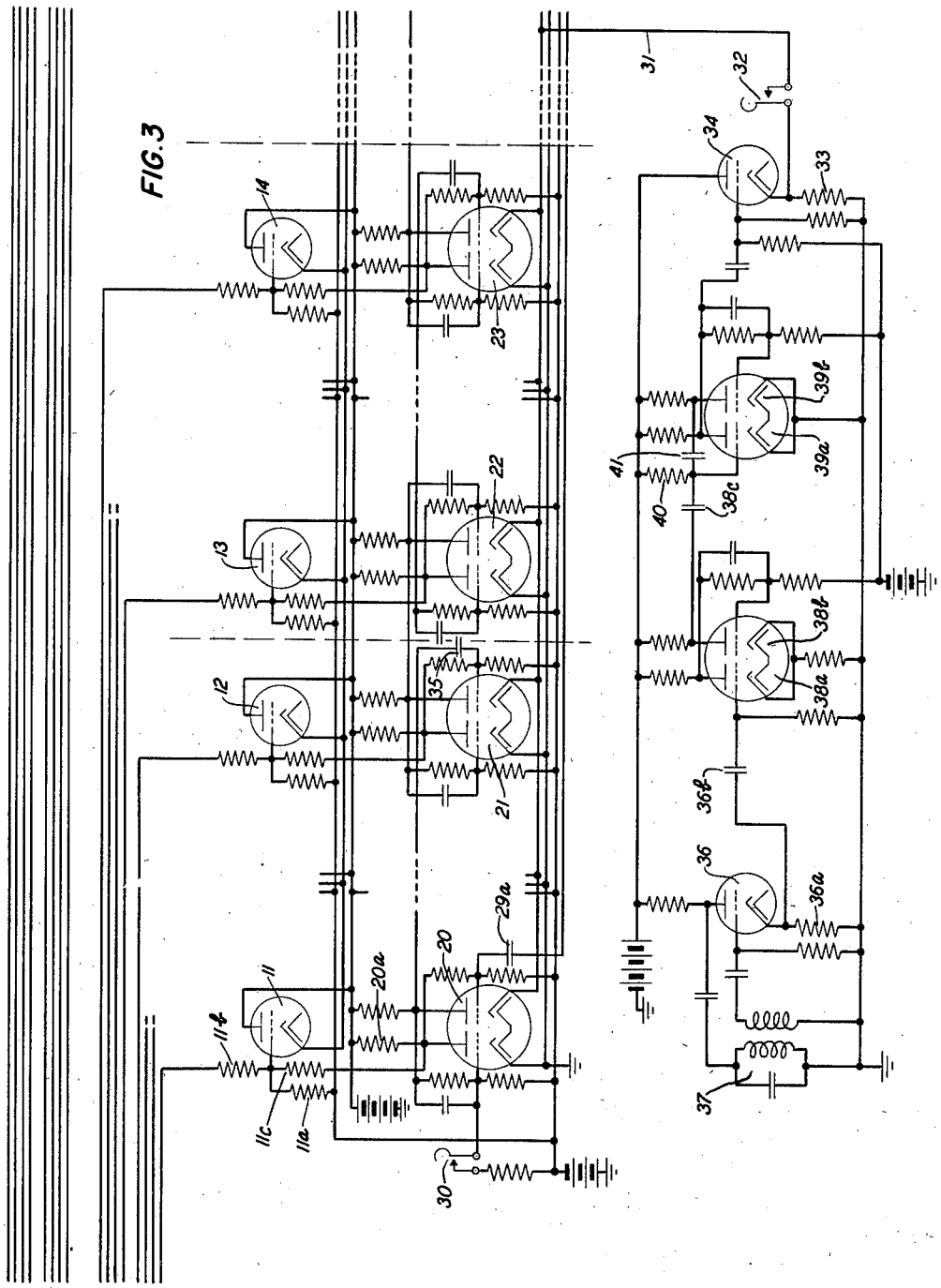

Jan. 27, 1953  A. WEAVER  2,626,994

MULTIPLEX TELEGRAPH SYSTEM

Filed Nov. 19, 1949  8 Sheets-Sheet 4

INVENTOR
*A. WEAVER*
BY
*J.W. Schmied*
ATTORNEY

Jan. 27, 1953   A. WEAVER   2,626,994
MULTIPLEX TELEGRAPH SYSTEM
Filed Nov. 19, 1949   8 Sheets-Sheet 6
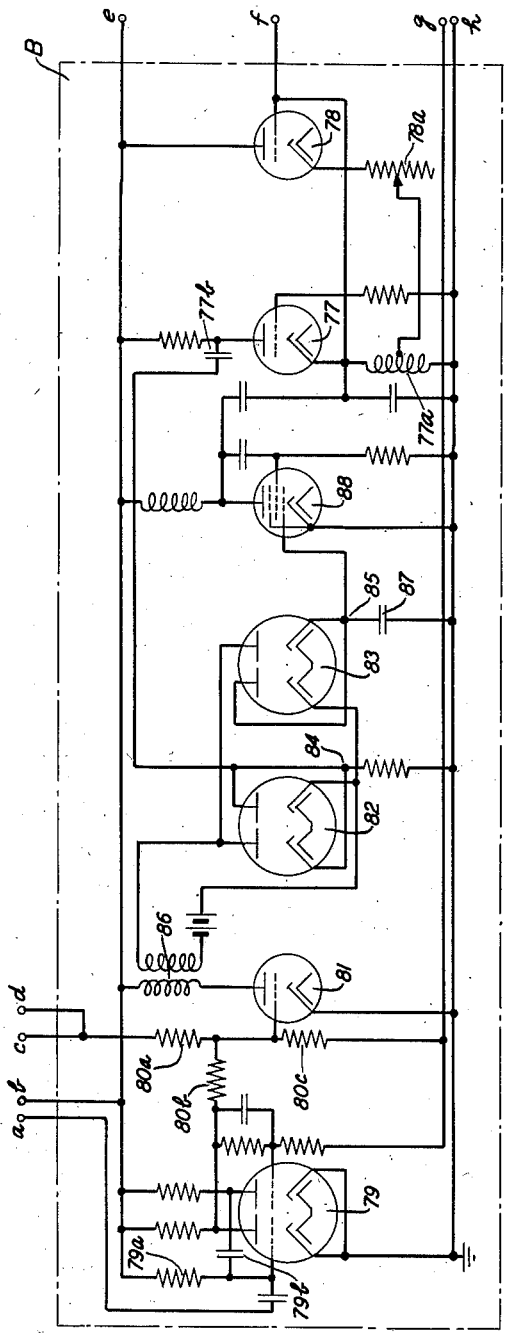
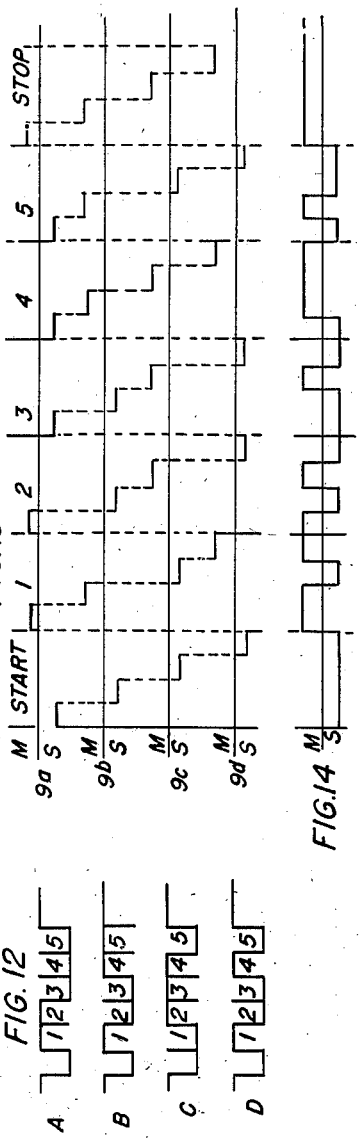
INVENTOR
A. WEAVER
BY
*J. W. Schmied*
ATTORNEY Jan. 27, 1953    A. WEAVER    2,626,994
MULTIPLEX TELEGRAPH SYSTEM
Filed Nov. 19, 1949    8 Sheets-Sheet 7

TIME ⟶

INVENTOR
A. WEAVER
BY
*J. W. Schmied*
ATTORNEY

Jan. 27, 1953　　　　A. WEAVER　　　　2,626,994
MULTIPLEX TELEGRAPH SYSTEM
Filed Nov. 19, 1949　　　　　　　　　　　8 Sheets-Sheet 8

INVENTOR
A. WEAVER
BY
J.W.Schmied
ATTORNEY

Patented Jan. 27, 1953

2,626,994

UNITED STATES PATENT OFFICE 2,626,994

MULTIPLEX TELEGRAPH SYSTEM

Allan Weaver, Port Washington, N. Y., assignor to Bell Telephone Laboratories, Incorporated, New York, N. Y., a corporation of New York Application November 19, 1949, Serial No. 128,395

17 Claims. (Cl. 178—50)

This invention relates to a transmission system for multiplexing a plurality of telegraphic channels to a single transmission medium, and for receiving and interpreting the information transmitted at some remotely located station to derive the intelligence originally contained in the telegraphic channels. The invention is applicable to telegraphic transmissions generally, and specifically to the type automatically operated by perforated tape or other previously prepared recordings.

In telegraphic systems, it is known to provide transmitting and receiving systems employing perforating and printing equipment of the permutation code type. One such system employs a perforating machine which translates the letters or symbols to be transmitted to perforations in a paper tape and may be of the type described in U. S. Patent No. 1,884,743 to Edward E. Kleinschmidt et al., granted October 25, 1932. Another such system employs a typing machine which prints the letters or symbols represented by received signals and may be of the type shown in Patent 1,904,164, granted April 18, 1933, to Sterling Morton et al., or in Patent 1,745,633, granted February 4, 1930, to Sterling Morton et al.

Start-stop automatic telegraphic systems employ mechanical transmitters operated by means of the aforementioned perforated tape, transforming the tape perforations into groups of electrical impulses. These impulses are ordinarily transmitted by time-division via a transmission medium to some remotely located receiving position. At the receiving position, the impulses are interpreted, and the letters or symbols to be transmitted are thereupon caused to be printed. Such transmitting apparatus is described in U. S. Patent No. 2,055,567 to E. F. Watson, granted September 29, 1936.

In order that the utility of the transmitting medium or transmission line may be increased, it may be desirable to increase the number of telegraphic messages which may be transmitted over the transmission medium.

While this specification describes the use of transmitting and printing equipment of the start-stop type, it is to be understood that the system according to the invention is not limited to such transmitting and printing equipment and may be applicable to communication systems of the time-division multiplex type, and to telemetering and synchronizing circuits generally.

The general operation of automatic telegraphic systems and the character of the signals transmitted should be understood for a comprehensive understanding of the system according to the invention. In start-stop automatic telegraphic systems, the transmitters are customarily operated by perforated tape. At the source of the desired intelligence, an operator causes the tape to be perforated in groups representing the letters or symbols to be transmitted. A corresponding group of sensing pins are provided which detect the number and arrangement of the perforations representing a given letter or symbol. The information received by the sensing pins, i. e., whether a perforated or non-perforated part of the tape is sensed, is discretely sampled by a mechanical distributor system associated with the transmitting equipment. The intelligence found on the relative sensing pins is analyzed by the transmitting distributor with respect to time and in addition, the distributor ordinarily traverses a synchronizing position which is used to synchronize the receiving equipment with the transmitting equipment. This system is, of itself, well known and described in aforementioned U. S. Patent No. 2,055,567 to Watson. In brief, the desired intelligence is mechanically scanned and then caused to be transmitted in the form of electrical impulses, over a transmission line, to a receiver. The receiver, remotely located, can analyze the received impulses through the provision of a synchronized mechanical distributor. The synchronized distributor cooperates with a "selector" magnet energizable in accordance with the received impulses, resulting in a derivation of the originally transmitted intelligence.

Electrical impulses produced as a result of the sensing of the perforated tape are known in the telegraphic art by the terms "marking" and "spacing." Two contrasting conditions of the line are indicated by these words. In some telegraphic systems, provision is made to cause the flow of current or to prevent the flow of current in the transmitting medium or line. In such a system, the line may be said to be in a marking condition when current is flowing and in a spacing condition when current is not flowing. It may be understood that in other types of systems, the terms marking and spacing may have somewhat different meanings.

In summary, according to the invention, an electronic distributor is provided which will connect a plurality of tape sensing equipments to a transmission medium in a predetermined order so that the intelligence contained on the tapes may be transmitted in seriatum to a remotely located receiving position. At the remotely located receiving position, a second electronic distributor distributes the received signals to perforating and/or printing equipment of the known types providing the information in desired form.

In addition to the transmission of the information proper, it will be necessary to provide for the transmission of certain synchronizing information. This information consists of synchronization between the several tape sensing equipments operating at the transmitting position and the receiving equipments interpreting the signals distributed by the receiving distributor. Other synchronizing information must be provided between the transmitting and the receiving distributors whereby these may be locked together as to phase and frequency.

As its main object, the invention will describe means for multiplexing a plurality of intelligence channels by means of synchronized electronic distributors.

While the description of the invention will assume a transmission line between the transmitting and receiving locations, it will be obvious to those skilled in the art that any transmitting medium which is capable of forwarding the necessary information between two desired locations may be suitable for use in conjunction with the invention described.

The invention is described in detail in the following specification:

Figure 1 shows a telegraphic tape sensing mechanism which may be used in conjunction with the apparatus described in the invention.

Figures 2, 3, 4, 5 and 6 show a schematic diagram of the system circuits in accordance with a preferred embodiment of the invention.

Figure 7 shows a schematic diagram of a further embodiment of a portion of the invention shown within Fig. 5.

Figure 8 shows an interrelation of the drawings in Figs. 2, 3, 4, 5 and 6 in accordance with the invention.

Figure 12 is a graphical representation of the code combinations representing the letters A, B, C and D in acordance with one commonly used permutation code.

Figure 13 is a diagrammatic representation of the transmission of the four code combinations of Fig. 12 by the transmitting distributor shown in Figs. 3 and 4.

Figure 14 is a graphical representation of the line potential variations resulting from the multiplexing of the four code combinations of Fig. 12, pulse by pulse in interlaced relation as shown in Fig. 13.

Figure 4:
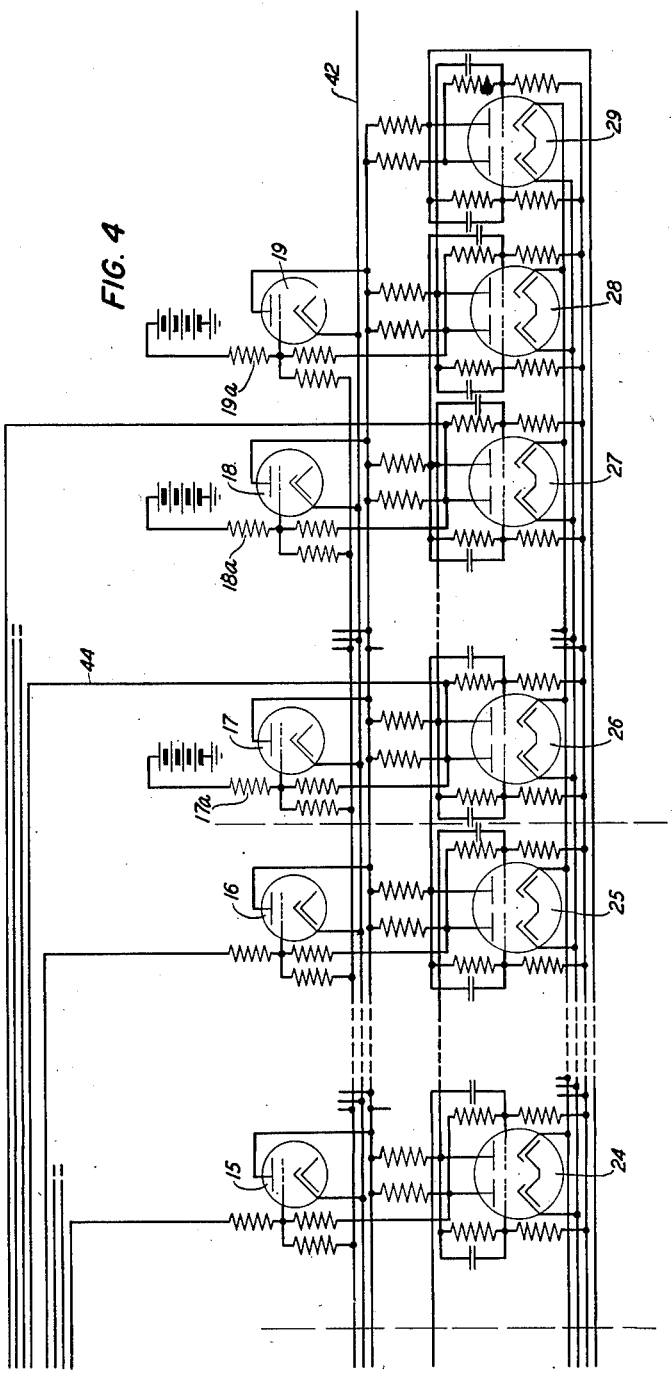

Referring first to Fig. 1, a typical tape sensing mechanism is here shown. The tape sensing mechanism is controlled by a perforated tape 1, prepared by a perforator or reperforator as previously indicated. Depending upon the positions of combinations of perforated and unperforated readings of the tape, the tape sensing mechanism will provide various code combinations. The arrangement is such that when a sensing pin 2 engages a hole in the tape 1, the sensing lever 3 and its contact 3–a controlled by that sensing pin will engage a cooperating contact 3–b. It may be assumed that a marking condition exists in the lead 3–c associated with lever 3 sensing a perforation.

At such times as the combinations presented to the various sensing pins have been scanned for the information they contain, the bail 4 is moved in a counterclockwise manner by bail operating magnet 4–a, overcoming the spring 4–b. Counterclockwise movement of bail 4 engages the tape sensing levers, and the sensing pins are withdrawn from the holes.

The tape 1 is provided with a series of feed holes, for example, 1–a, arranged approximately along the center line of the tape by which it is intermittently advanced by sprocket 6. The advance of sprocket 6 is controlled by the operation of the ratchet mechanism 6–a; the sprocket advances the perforated tape one perforation group for each operation of the ratchet mechanism 6–a. The counterclockwise movement of the bail 4, energized by the start magnet 4–a can be utilized to move the ratchet, in addition to withdrawing the sensing pins, allowing advance of the perforated tape.

In the normal operation of the tape sensing mechanism, differences may frequently occur between the rate at which the tape sensing mechanism operates and the rate at which the tape is supplied to the tape sensing mechanism from the perforator or reperforator. It may be seen that an interruption in perforator or reperforator operation will ultimately cause a taut condition of the tape 1 and the tape feed holes would be damaged unless provision were made to stop the tape sensing mechanism. Bell crank 8 will cause armature 7 to break with its associated contact 7–a when tape 1 becomes taut; the operation of the stepping ratchet will be prevented by the breaking of this contact which causes the stepping magnet to remain deenergized. The electric circuit upon which these conditions depend will be later described in detail.

It may be seen that depending upon which of the sensing pins enter perforations in the tape for each given step of the tape, a group of marking or spacing conditions will be obtained at the contacts associated with the various sensing pin levers. In brief, the intelligence represented by the perforation in the tape will be interpreted at the contacts of the tape sensing mechanism in terms of various marking and spacing combinations.

Referring now to Fig. 2, four tape sensing mechanisms of the type described with reference to Fig. 1 are shown at 9–a, 9–b, 9–c and 9–d. The contacts coupled to the sensing pins are shown, for example, as 10–a and 10–b; the numbers required depends upon the number of sensing pins employed. One tape sensing mechanism in common usage employs five sensing pins and contacts, and is the one shown. The three intermediate sensing pin contacts are only indicated in outline, to clarify the drawing.

While four tape sensing channels are shown in reference to the accompanying description, it is to be understood that the system may be employed with a greater or lesser number of tape sensing mechanisms. One tape sensing mechanism will be required for each message channel to be transmitted.

The general plan will be to couple each of the contacts corresponding to 10–a and 10–b in each of the various tape sensing mechanisms to the transmission line sequentially and at a repetitive rate. This coupling must be at a rate equal to the rate at which the tape sensing mechanisms will pass individually from one group of symbols on the perforated tape to the next. When this condition is fulfilled, the intelligence of each symbol group to be found on the perforated tape will be supplied to the transmission line.

In addition, accompanying each symbol group of signals supplied by a tape sensing mechanism, there must be transmitted therewith a group of synchronizing signals. In the type of telegraphic communication herein described, such signals are of the "start-stop" type. With each of the tape sensing mechanisms to be multiplexed, it will be necessary to have appropriate stop and start signals. In the system according to the invention, the "stop" synchronizing signal is arbitrarily chosen as a marking condition; the start signal will therefore be a spacing signal.

A customary sequence of transmission with tape sensing mechanisms and automatic telegraph equipment generally, is to provide first the start signal; then, each of the sensed intelligences, ordinarily numbering five; and a seventh signal, the stop signal. In the system according to the invention, the various start signals of each of the four tape sensing mechanisms are first to be transmitted in seriatum. Similarly, the condition of each of the second, third, fourth and fifth sensing pins will in turn be transmitted in seriatum. Finally, the stop signal of each of the four tape sensing mechanisms will then be transmitted in seriatum.

To provide a connection for impressing each of the foregoing signals upon the line in the manner heretofore described will require seven distributor segments for each of the four tape sensing mechanisms 9-a, 9-b, 9-c and 9-d; a total of twenty-eight distributor segments. It will further be found necessary to provide two distributor segments for the stopping and starting pulses of the multiplex distributors themselves, making a total of thirty distributor segments for multiplexing four tape sensing mechanisms of the type described.

Transmitter

Figs. 3 and 4 represent the multiplexing electronic transmitting distributors. As previously indicated, each of the tape sensing mechanisms will ordinarily have a group of five positions to be scanned. In order that the distributor may be conveniently represented, triodes 11 and 12 are representative of a group of "gate" triodes coupled to generate the start signals of the tape sensing mechanisms. For clarity, the gate tubes for tape sensing mechanisms 9-b and 9-c are not shown in detail. Similarly, each of the tape sensing pin contacts such as 10-a and 10-b must be connected to individual gate triodes; the first tape sensing pin contact of each of the four tape sensing mechanisms, e. g., 10-a of tape sensing mechanism 9-a, will be connected to one of a bank of gate triodes indicated generally by triodes 13 and 14. In addition, the second, third and fourth tape sensing pin contacts of each tape sensing mechanism are connected to one tube in corresponding banks of gate triodes omitted from Figs. 3 and 4 for clarity. The fifth tape sensing pin contact of each of the tape sensing mechanisms, e. g., 10-b of tape sensing mechanism 9-a, is connected to one of the gate triodes represented generally by triodes 15 and 16. The stop signal of the various tape sensing mechanisms have been assumed to always be marking signals. As a result, the gate triodes represented generally as 17 and 18 may have their grids connected directly to a positive supply; this will be shown as providing a marking condition to the line whenever the individual gate triodes representative of the "stop" signals are scanned.

Transmitting distributor

The function of the transmitting distributor is to connect successively each of the tape sensing and the synchronizing signals to a common transmission line for a short interval of time. Referring to Figs. 3 and 4, the distributor circuit proper is composed of two parts: a group of gate circuits, whose general operation has previously been outlined and represented in the figures as associated with triodes 11 through 19, and a multivibrator counting ring circuit associated with triodes 20 through 29. The multivibrator counting ring develops control voltages to be applied to the individual gate tubes, successively opening each of the gates for a measured period of time and in a predetermined sequence. For the sake of simplicity, the multivibrator ring triodes corresponding to the gate tubes not shown are similarly not shown. Each gate tube to be controlled, however, must have an associated pair of ring control triodes.

The operation of the duel triodes 20 may be examined in the light of "normal" or "closed gate" conditions. The closed gate triodes indicated at 20 are connected in a multivibrator circuit having two conditions of stability; the left-hand triode will normally be conducting and the right-hand triode non-conducting. This static condition is obtained through the proper selection of circuit parameters; the choice of resistances and potentials energize the triodes 20. Each of the corresponding left-hand triodes of the various multivibrator tubes 20 through 29 is similarly normally conducting while the right-hand triode is normally non-conducting.

Energization of the system is achieved by closing the start key 30. Closing the start key applies a negative potential to the grid of left-hand triode 20, now rendering this left-hand triode non-conducting. The non-conducting condition of the left-hand triode raises the voltage appearing at the anode of the left-hand triode. The current drawn through resistance 20-a when triode 20 is conducting produces a voltage drop from the anode potential supply to the anode of the left-hand triode. When this current falls to zero, the anode voltage on the left-hand triode rises to a more positive value. The grid of the right-hand triode of 20 is connected through a resistance to the anode of the left-hand triode. Inasmuch as the anode now attains a higher positive potential, the grid of the right-hand triode 20 also reaches a higher positive potential and causes the right-hand triode to become conducting.

It is to be noted that the cathodes of the various left-hand triodes are connected to ground; but the cathode of the right-hand triodes are connected in multiple to a common line 31, thence to an operating key 32, and to resistance 33. A ground return is provided to the cathodes of the right-hand triodes through the latter path to ground; depending upon whether operating key 32 is opened or closed and upon the voltage appearing across cathode resistance 33, a ground return will be available to the cathodes of the right-hand triodes. When triode 34 becomes conducting, in a manner later to be described, the cathodes of the various right-hand triodes of the multivibrator ring will receive a positive pulse with respect to their grids. It has previously been shown that operation of start key 30 causes the right-hand triode of 20 to become conducting and the left-hand triode of 20 to become non-conducting. Assuming that triode 34 becomes conducting, the right-hand triode of 20 will have applied in its control grid-cathode circuit a negative grid potential sufficient to cause the right-hand triode again to become non-conducting.

The voltage developed across the resistor 33 will hereinafter be shown to be a pulsed square wave as shown in Fig. 10-e. The net performance of the right-hand triode of multivibrator 20 is to provide, in seriatum, non-conducting, conducting, and non-conducting conditions, with a voltage resultant at the anode of right-hand triode of 20 corresponding to Fig. 9-a. The time width of the conducting portion of the voltage wave will be found equal to one segment of the distributor operation, having a time equal to T. The anode of the right-hand triode is connected through a capacitance to the grid of the succeeding right-hand triode. While other multivibrator ring tubes will intervene, it may conveniently be assumed that the anode potential of right-hand triode 20 is supplied to the control grid of the right-hand triode of 21 through capacitance 35. The negative to positive transition of the anode of right-hand triode of 20 in going from the conducting to non-conducting condition will impress a positive voltage on the control grid of the said succeeding right-hand triode. The normal or closed gate condition of the triodes at 21 have been such as to assume that the left-hand triode is conducting and the right-hand triode is non-conducting. An application of the positive voltage to the control grid of the non-conducting right-hand triode will change these normal conditions, rendering the right-hand triode conducting and the left-hand triode now non-conducting, in the manner described with reference to 20. The negative to positive voltage transition which provides the triggering signal for the right-hand triode of 21 occurs when the right-hand triode of 20 is returning to its normal non-conducting condition. The previous positive to negative transition of the right-hand triode of 20 will not alter or affect the right-hand triode of 21; right-hand triode 21 is at cut-off at this time, in any event, and the positive to negative transition will merely apply a more negative potential to its grid.

Conduction of the right-hand triode of 21 in the manner previously described ultimately results in its left-hand triode becoming non-conducting. The cathode of right-hand triode of tube 21 is in multiple with the same line as the cathode of right-hand triode of tube 20 and is therefore connected with lead 31 and operating key 32 to the cathode resistance 33. The new conducting condition of right-hand triode of 21 will continue until conduction is obtained through triode 34, at which time the grid-cathode circuit of the right-hand triode extending through resistance 33 will have applied thereon a negative grid voltage sufficient to cut off the right-hand triode of 21, restoring the left-hand triode to its normal conducting condition.

The decay of the conducting condition of the right-hand triode of 21 will cause the succeeding multivibrator ring right-hand triode to become conducting, in turn, and the cycle of operations as described with reference to right-hand and left-hand triodes of 21 will be repeated. It may be seen that the relative time in which each of the pairs of triodes remain in their non-static condition will depend upon the interval of time between successive conductions of triode 34.

The process will be repeated in each successive tube in the multivibrator ring circuit, the last multivibrator ring tube 29 having the right-hand anode connected to the control grid of right-hand triode of tube 20 through capacitance 29-a, thus reestablishing the ring cycle without further operation of start lever 30.

Figure 9A:
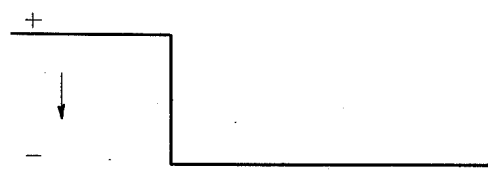
Figures 9, 10 and 11 are timing and waveform diagrams to aid in the explanation of the invention.
Figure 9B:
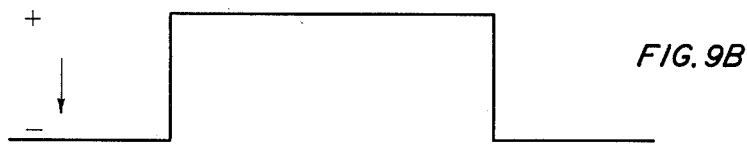
Figure 10A:
Figure 10B:
Figure 10C:
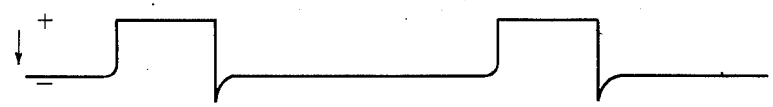
Figure 10D:
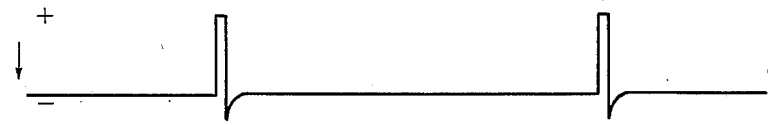
Figure 10E:
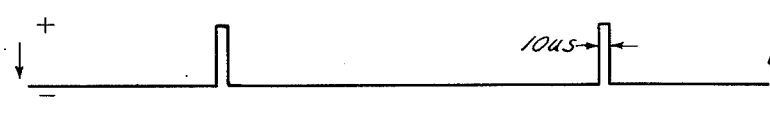
Figure 11A:
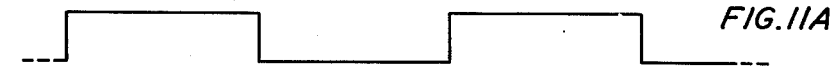
Figure 11B:
Figure 11C:
Figure 11D:
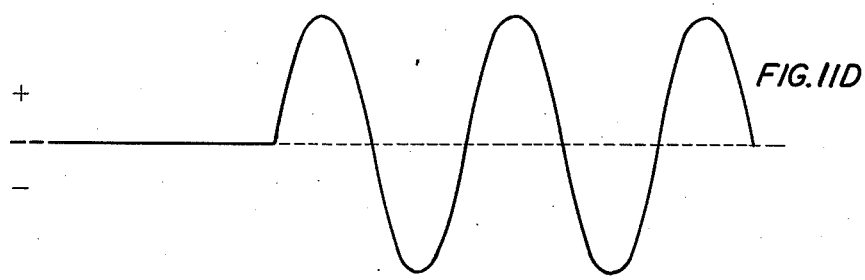
Figure 11E:
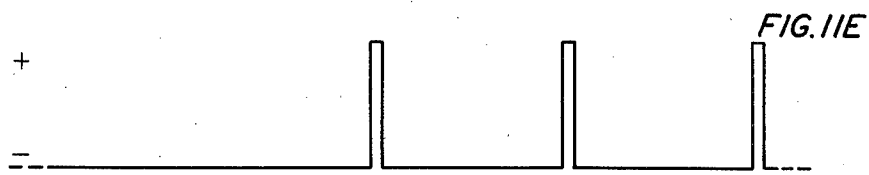
Figure 11F:
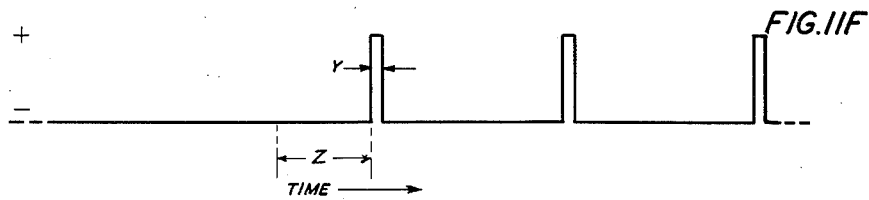

The net result of the operation of the multivibrator ring as it passes through its cycle is to provide output pulses of voltage at the anodes of successive left-hand triodes of the various multivibrator ring tubes 20 through 29. The individual pulse will have a waveform as shown in Fig. 9-b. This output pulse will have a time width equivalent to the time interval between successive conductions of triode 34 and the resulting pulse obtained across cathode resistance 33.

The manner of producing "stepping pulses," i. e., pulses obtained through the conduction of cathode 34, will next be described. Referring again to Fig. 3, an oscillator employing a triode 36 has associated with its anode-cathode circuit a tuned oscillatory circuit 37. This oscillator will provide a source of oscillations dependent in frequency, inter alia, upon the magnitudes of capacitance and inductance of tuned circuit 37. The voltage at tuned circuit 37 is a sine wave as shown in Fig. 10-a having a frequency such that each cycle is equivalent in time to the desired elapsed stepping time between the successive segments of the multivibrator ring; the output of the oscillator is obtained across cathode resistance 36-a and is a sine wave having its negative half cycles substantially suppressed because the tuned circuit drives triode 36 beyond cut-off.

The output of triode oscillator 36 is supplied to a squaring circuit employing dual triodes 38-a and 38-b. The wave shape supplied from the cathode-coupling resistor 36-a through the coupling condenser 36-b is in the form of a succession of approximate half cycles in the positive direction shown in Fig. 10-b. Triode 38-a is nonconducting in the absence of any signal on its grid and the approximate half cycle obtained through the coupling condenser 36-b is applied to its grid. When the loop of the half cycle wave shown in Fig. 10-b reaches a predetermined value "X," triode 38-a will be rendered conductive and when the half cycle wave shown in Fig. 10-b passes its maximum and reaches a predetermined value such as "W" the triode 39 cuts off. Triode 38-b operates primarily as an amplifier. Both of the dual triodes 38-a and 38-b have a common unbypassed cathode resistance. This unbypassed resistance, in effect, provides a positive feedback, steepening the sides of the resultant signal output. Essentially, a square wave will be developed at the output of triode 38-b, having a wave shape as shown in Fig. 10-c.

Triode 38-b has its anode connected through capacitance 38-c to the grid of one of a pair of dual triodes 39-a and and 39-b. The succeeding stage 39-a and 39-b is a pulse generator in the form of a singlevibrator having one condition of stability. This singlevibrator will be triggered by the square-topped signals received from triode 38-b. Triode 39-a in static condition has a large positive direct-current bias supplied through resistance 40 from the anode-supplied voltage; as a result, triode 39-a normally conducts. The resulting low voltage applied from the anode of the triode 39-a to the grid of the right-hand triode of the singlevibrator holds the right-hand triode at cut-off. Upon the decay of the square-topped wave shown in Fig. 10-c, the positive to negative transition of the wave will drive the grid of triode 39-a to a more negative position, past cut-off. The subsequent rise in anode voltage of triode 39-a, applied to the control grid of triode 39-b, causes that triode to become conducting. Conduction of the triode 39-b, in turn, causes a pulse to be transmitted from its anode through capacitance 41 to the control grid of triode 39-a. Triode 39-a will again become conducting and the singlevibrator will be restored to its original condition. The growth of the square-topped wave shown in Fig. 10-c causes an increasing positive potential on the grid of triode 39-a; inasmuch as 39-a is already conducting, it will be left unaffected. As a result, only one pulse will result for each square-topped signal and ultimately for each cycle of the local oscillator.

A pulse having a wave shape as shown in Fig. 10-d is developed at the anode of triode 39-a. This pulse may be made of extremely short duration, depending upon the constants of the singlevibrator, e. g., capacitance 41.

The pulses obtained from the anode of triode 39-a of the singlevibrator are supplied to a cathode follower amplifier 34. Cathode follower amplifier 34 will conduct upon the application of the pulses obtained from the pulse generator 39-a. The function of the conduction of triode 34 and its associated cathode resistance 33 has previously been discussed with relationship to the stepping of multivibrator distributor ring; an output is obtained across the cathode resistance 33 of the amplifier 34 having a wave shape as shown in Fig. 10-e. A pulse width of approximately 10 micro-seconds has been found desirable in amplifier 34.

The electronic gates of the transmitting distributor are composed of triodes as 11 through 19. Each of these triodes has three voltages applied to its respective control grid. For example, gate triode 11 has its control grid coupled through resistance 11-a to a negative direct-current bias source; through resistance 11-b to lead 47 representing the start signal of codes supplied by tape sensing mechanism 9-a; and through resistance 11-c to the anode of left-hand multivibrator ring triode of tube 20. The negative direct-current bias supply through resistance 11-a will hold triode 11 non-conducting irrespective of other signals supplied through resistance 11-b; as a result, the latter signals will not be transmitted when only these two voltages are applied. However, when multivibrator ring triodes 20 pass from their static to non-static condition as previously described, the normally conducting left-hand triode becomes non-conducting and its anode bears an increasingly positive voltage. When this increasing voltage is added to the negative direct-current bias supplied through resistance 11-a, the negative direct-current bias will have such a value that the conduction of the gate triode 11 will depend upon whether or not a positive potential is supplied to the control grid through resistance 11-b. If a positive potential is applied to resistance 11-b representing a marking condition of intelligence from the tape sensing mechanism, the algebraic sum of the voltage applied through resistances 11-a, 11-b and 11-c will be such as to cause triode 11 to be conducting. If no signal voltage is applied through resistance 11-b to the control grid of triode 11, the algebraic sum of the voltages supplied through resistances 11-a and 11-c will not alone be sufficient to cause gate triode 11 to become conducting. Similarly, a marking condition or positive voltage applied through resistance 11-b, when combined algebraically with the direct-current bias supplied through resistance 11-a, will not be sufficient to render the gate triode 11 conducting.

To recapitulate, in order that the gate triode 11 shall be conducting, the associated left-hand triode of the multivibrator ring tube must be in its non-static condition and the intelligence supplied from the tape sensing mechanism must apply a positive voltage representative of a marking condition through the resistance 11-b to the gate triode 11. The cathode of gate triode 11 is connected to the transmisison line 42; conduction of the gate triode indicates to the line that the distributor has reached that segment of the distributor cycle corresponding to gate triode 11 and that a marking condition is being supplied from the tape sensing mechanism to the gate triode. The cathode of gate triode 11 draws current through the transmission line 42 when the receiving end of the transmission line is connected through an appropriate termination to ground.

Similarly, gate triodes 12 through 19 will draw a cathode current indicating a marking condition at such times as the multivibrator ring and the signal supplied from the tape sensing mechanism or other sources indicate that a marking condition exists at a certain one of the gate triodes. If a spacing condition is indicated from the tape sensing mechanism, the individual gate triode thereby affected will not conduct and a spacing condition will be transmitted to the line.

It is to be remembered that the group of triodes representing the stop signals of the various tape sensing mechanisms always supplies a marking condition to the line. As a result, this group of gate triodes, represented in Fig. 4 as 17 and 18, have their grids connected directly through resistance 17-a and 18-a to a positive potential source.

*Tape sensing mechanisms—Coordination*

The operation of the various tape sensing mechanisms must be properly coordinated with the transmitting distributor. The individual bail operating magnets must be operated at appropriate points in the distributor cycle of rotation. Means must also be provided to care for the cession of operation of one or all of the tape sensing mechanisms.

Referring to Fig. 1, a general mechanical description of the tape stepping arrangements has previously been given. At such time as one of the perforation groups has been scanned, the bail 4 must be moved in a counterclockwise manner, withdrawing the sensing pins from the holes and then advancing the tape to the succeeding perforation group. Movement of the bail is accomplished by energization of the bail magnet in the manner previously described.

Bail magnet 4-a of Fig. 2 is operated by the left-hand triode of the multivibrator ring tube 26 in the following manner: when the information contained on the cooperating tape sensing contacts extending between 10-a and 10-b has been scanned, the multivibrator ring will have opened the gate tubes associated with each of these contacts, and will have finally arrived at the point of opening the stop signal gate triode 17. As previously indicated, opening of stop gate 17 provides a marking line condition indicative of the stop position. In addition, the intelligence contained in that particular tape position has now been transmitted and the tape mechanism is in condition for advance. The operation of the left-hand triode of multivibrator tube 26 will cause an increasingly positive potential at the anode of this left-hand triode. This rising voltage passes over lead 44 to the control grid of triode 45. Triode 45 is connected as a cathode follower amplifier, in turn coupled to the succeeding stage comprising a pentode 46. A path is provided from the anode of pentode 46 through the windings of start magnet 4-a to the lower contact 7-a and armature 7 of the taut tape control, to a potential supply. Upon the negative to positive transition of the left-hand triode of 26, the signal received at the grid of triode 45 will cause pentode 46 to conduct with sufficient anode current so that start magnet 4-a will be operated. These conditions exist only as long as contact swinger 7 is made with contact 7-a.

Thus, operation of the multivibrator ring tube associated with the stop signal gate position of one of the tape sensing mechanisms will cause the cooperating start magnet to become energized. As the multivibrator ring passes to the next segment, the left-hand triode of multivibrator ring tube 26 will turn to its former lower anode voltage and the consequent decrease in the anode current of pentode 46 will release tape stepping magnet 4-a. Similarly, operation of each of the multivibrator ring tubes associated with the various stop signal gate triodes between 17 and 18 inclusive, energizes the various bail operating magnets associated therewith.

As previously described, a taut condition of the tape must arrest the operation of the stepping mechanism by opening armature 7 and contact 7-a. Thus, a taut tape condition will open the anode circuit of pentode 46 with respect to the source of positive potential; consequently, the energization of the bail operating or tape stepping magnet is prevented.

At such times as the tape stepping magnet is no longer energized under conditions described in the previous paragraphs, the tape sensing mechanism will have no information to supply the transmitting distributor. Ordinarily, this would cause the tape sensing contacts to remain open and the transmitting distributor would scan five open tape sensing contacts. Five open contacts may well indicate a letter or symbol such as the "lower case" signal at the receiving position. To avoid a repetitious transmission of some letter or symbol, as the lower case or "letters" signal to the receiving position, operation of the taut tape lever 8 shown in Fig. 1 causes the swinger 7 to make with contact 7-b shown in Fig. 2. A taut tape condition thus applies a positive voltage to lead 47 and ultimately to the grid of triode 11 through resistance 11-b. In accordance with the previous assumption, the start signal of the tape sensing mechanism is assumed to be a spacing condition, and correspondingly with the tape control in slack position, no signal voltage is supplied the grid of the gate triode. For example, in tape sensing mechanism 9-a, in the normal course of its operations, the armature 7 will normally be made against the lower contact 7-a, closing the stepping magnet circuit; the upper contact 7-b will remain open. This open condition is reflected at the grid of gate triode 11 as a spacing condition and triode 11 will not conduct, thus passing a spacing condition to the line. However, upon the taut tape condition, a marking signal will be transmitted to the line by the gate triode 11 and as a result, the spacing condition representing a start signal will not be transmitted. The receiving equipment will receive no starting impulse for the particular equipment corresponding to tape sensing mechanism 9-a, and will not receive the lower case or "letters" symbol repeatedly while tape sensing mechanism 9-a is out of operation. Similarly, with each of the tape stepping mechanisms 9-b, 9-c and 9-d, a taut tape condition arrests the operation of the associated tape stepping magnet and will cause a marking instead of a spacing condition to be transmitted as a start signal by the associated gate triode.

*Distributor synchronization*

Provision must be made for synchronization of the transmitting and receiving distributors as well as for the synchronization of the receiving recorders with the transmitting tape sensing mechanisms previously described. In order that synchronization of the distributor can be effected, two additional segments are added to the electronic distributor in addition to those required for the transmission of the intelligence and synchronization received from the tape sensing mechanisms. The synchronization of the transmitting and receiving distributors will be accomplished through the transmission of first a stop and then a start signal. The stop synchronizing signal will be assumed a marking line condition; the distributor start signal will be assumed a spacing line condition.

Referring now to Fig. 4, the two additional segments required are indicated by dual triodes 28 and 29 of the multivibrator ring. Upon completion of the distributor cycle through the final stop signal of the transmitted code combinations, dual triode 27 will be restored to its normal or static condition and dual triodes 28 will assume the nonstatic condition as previously described in connection with the multivibrator ring triodes 20 and 21. A gate tube 19 will provide a marking line condition; a positive potential source is connected through resistance 19-a to its control grid. This marking condition represents the transmitting distributor stop signal. The next segment of the distributor, upon the return of dual triodes 28 to static condition, will be dual triode 29. As no gate tube is associated with 29, a spacing condition will automatically be transmitted to the line. Upon the return of dual triode 29 to its static condition, a signal will be transmitted to the right-hand triode of multivibrator ring tube 20, reinitiating the transmitting distributor cycle in accordance with the prior description.

*Receiver*

In the previously cited U. S. Patent No. 1,904,164, means are disclosed which will print desired intelligence from signals derived of tape sensing mechanisms of the type previously described. These signals are supplied to a selector magnet, adapted to control various mechanical linkages, ultimately resulting in the printing of the letters and symbols represented by the various perforations originally supplied the tape sensing mechanisms.

Figure 5:
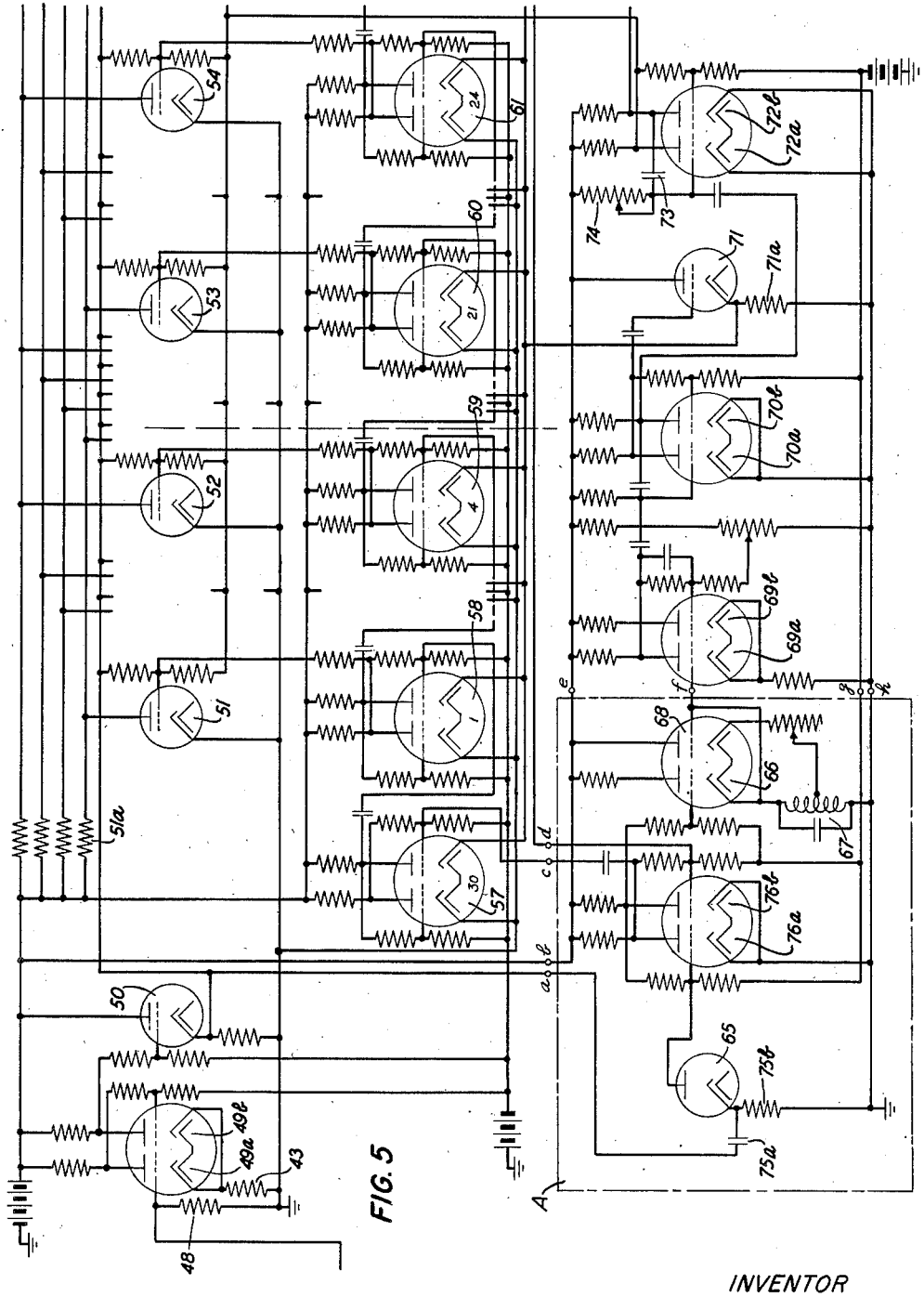

In accordance with the intelligence and synchronization imparted to transmission line 42 in Fig. 4, resistance 48, shown in Fig. 5, develops a voltage at such times as the line 42 is in marking condition. It is to be remembered that resistance 48 is connected in multiple with the cathodes of all of the gate triodes, forming the return path to ground for the cathode of each of these. As a result, the opening of any one of the gate triodes indicates a marking condition of the line, causing a voltage to be developed at the receiving position across resistance 48.

The opening of the gate triodes at the transmitting location occurs abruptly and provides a steep-fronted wave as a result of the transition from marking to spacing or spacing to marking condition. This steep-fronted or square wave will be attenuated in wave shape, becoming more nearly a sine wave, depending upon the length and characteristic of the transmission line. In order to restore the received wave to its original condition, dual triodes 49-a and 49-b comprise a wave-squaring circuit or line trigger operating in a manner similar to that described with reference to squaring circuit triodes 38-a and 38-b. This wave-squaring circuit, a single vibrator, will restore the square wave shape of the received signals, the unbypassed cathode resistance 43 providing positive feedback and steepening the sides of the wave.

The squared output is in turn supplied to a cathode-coupled line amplifier employing triode 50. The cathode output of line amplifier 50 is in turn applied in multiple to the control grid of a group of receiving gate tubes indicated generally as 51 through 56. In addition, the output of line amplifier 50 is supplied to the cathode of a diode 65.

The general plan at the receiver is analogous to that employed with regard to the transmitter. Each of the various receiving gate triodes will be opened in sequence and at an appropriate time, coupling the incoming line to the energizing magnet of the appropriate telegraph printing machine. The opening of the receiving gate triode at the appropriate instant is accomplished through the use of a receiving multivibrator counting ring which, in turn, is stepped by a local oscillator.

Synchronization of the receiving distributor with the transmitting distributor can be accomplished in several ways, two of which are herein described. One system disclosed employs the start-stop principle, arresting the progress of the receiving distributor until the receiving and transmitting distributors are synchronized in accordance with a transmitted synchronizing signal. A second form of the invention employs means to correct the frequency of the oscillator that produces the stepping pulses for the receiving distributor to that of the transmitting distributor.

*Receiving distributor*

The operation of the receiving distributor is analogous to that of the transmitting distributor. The function of the receiving distributor will be to connect the incoming signal as sharpened by the line trigger or squaring circuit to the appropriate receivers which will interpret the various messages transmitted. The multivibrator ring is comprised of dual triodes 57 through 64. As in the transmitting distributor, the static or closed gate condition of the individual multivibrator counting ring tubes has the left-hand triodes of the ring tubes conducting and the right-hand triodes non-conducting. Upon application of a stepping pulse to the right-hand triode cathode, a non-static condition ensues in which the left-hand triode becomes non-conducting and the right-hand triode conducting. This conducting, non-conducting, conducting cycle produces voltage variations of predetermined amplitude and duration which are employed to open the receiving gate triodes and to operate the succeeding segment of the distributor as described in connection with the transmitting distributor. Each of the receiving gate triodes 51 to 56 has impressed upon its control grid three voltages: one from its associated multivibrator ring tube, one from the line amplifier 50, and a third voltage from the anode of triode 72-a, called the selecting time interval control.

With regard to the selecting time interval control, it is found desirable to open the receiving gate circuits for only a short percentage of the time available at each segment of the receiving distributor. The received pulses corresponding to the individual segments are sampled only for such a small period of time, and approximately at the center of the pulse. It can be seen that if the receiving gate triode were triggered solely by the received signal and the multivibrator ring, the receiving gate triode would be opened for a period of time determined solely by the segment or space of the multivibrator ring and the marking condition of the received signals. As a result, ambiguity between successive signals through minor errors in synchronization of the transmitting and receiving distributors could cause an erroneous transmission to be supplied the telegraph printing equipment. To obviate this difficulty, a third voltage is made requisite to the opening of the receiving gate triode.

By circuits later to be described, it will be shown that this third voltage, the selecting time interval control voltage, is a narrow pulse existing approximately at the center of each of the received pulses and opening the gate circuits for a relatively short period of time at this point. The algebraic sum of any two of the voltages supplied to the grid of the receiving gate triode will not be sufficient to cause the receiving gate triode to become conducting. As a result, conduction of the gate triode does not take place until the selecting time interval control produces its narrow pulse and conducting ends when the pulse has ceased. In addition, a marking condition of the line, determined by the output of amplifier triode 50, must exist simultaneously with the appropriate multivibrator ring voltage and selecting time interval control voltage to provide conduction of any of the gate triodes.

The anode circuit of each of the receiving gate triodes 51 through 56 is connected to the appropriate energizing magnet such as 89 in the various printing telegraph receivers through a "selector lock," later described in detail. The arrangement of the receiving gate triodes 51 through 56 and the receiving multivibrator ring tubes 57 through 64 is such that the signals derived from each of the tape sensing mechanisms are supplied to discrete, cooperating telegraph printing equipment or other receiving devices.

Irrespective of the method of synchronization employed, means must be provided to step the multivibrator ring. Such means include the generation of stepping pulses generated in a manner as in the transmitting multivibrator ring.

Referring to Fig. 5, oscillator 68 employs a tuned oscillatory circuit 67. This tuned oscillatory circuit provides an output having a frequency equivalent to the desired stepping pulse rate. This frequency must be substantially equal to that of the transmitting oscillator. The output of oscillator 68 shown in Fig. 11-d is taken from the upper end of oscillatory circuit 67 which is connected to the grid of oscillator triode 68, and is coupled to the grid of the first triode of a squaring circuit comprising dual triodes 69-a and 69-b. Triodes 69-a and 69-b compare in structure and operation with the squaring circuits of the transmitter, triodes 38-a and 38-b in Fig. 3. As in the case of the transmitter, the output of the squaring circuit is supplied to a pulse generator employing dual triodes 70-a and 70-b. Triodes 70-a and 70-b are comparable with stepping pulse generator 39-a and 39-b. In turn, the output of triode 70-a is supplied to the grid of a cathode-coupled pulse amplifier triode 71 having an output as shown in Fig. 11-c. The cathode resistance 71-a of pulse amplifier 71 supplies a return path for the cathode of the right-hand triodes of the various multivibrator ring tubes and will step the multivibrator ring, as did cathode resistance 33 and pulse amplifier 34 with regard to the transmitting multivibrator ring.

A stepping pulse is also generated by the stepping pulse generator 70-b, opposite in phase to that supplied to the pulse amplifier 71 by stepping pulse generator triode 70-a. This pulse of opposed phase is supplied to the grid of triode 72-a, one of a pair of triodes 72-a and 72-b comprising the previously mentioned selecting time interval control. The selecting time interval control is a single vibrator having one condition of stability, with left-hand triode 72-a normally conducting and right-hand triode 72-b normally non-conducting. An analysis of the instantaneous relationship between the pulse generators and the selecting time interval control discloses that the static condition of the pulse generator 70-a is normally conducting and of 70-b, normally non-conducting. Upon reception of the decay of the square-topped wave from the squaring circuit triode 69-a, triode 70-a becomes non-conducting and triode 70-b becomes conducting.

The result of the non-conducting condition of triode 70-a has been described; the increasingly positive voltage is applied to pulse amplifier 71 and thence to the multivibrator ring. At the same instant, the anode of triode 70-b experiences a transition to a less positive voltage, ultimately applying a less positive voltage to the control grid of selecting time interval control triode 72-a. This renders triode 72-a now non-conducting and triode 72-b conducting. The control grid of triode 72-a is coupled to the anode of triode 72-b through capacitance 73 and to a positive potential source through rheostat 74. Depending, inter alia, upon the values of capacitance 73 and the value and adjustment of rheostat 74, the momentary negative transition of the control grid of triode 72-a is overcome, returning the selecting time interval control to the normal or static condition. The time-width, Y, in Fig. 11-f, of the selecting time interval control pulse will be dependent largely upon the value of the R-C network 73 and 74. The displacement, Z in Fig. 11-f, of the latter pulse from the beginning of each segment will depend on the value of resistance 74.

It has been stated that triode 72-a is normally conducting and becomes non-conducting. The anode of triode 72-a thus experiences a transition to a more positive voltage when triggered from static condition. This increasingly positive voltage is applied in multiple to the control grids of the various receiving gate tubes, providing the third voltage necessary to open the appropriate receiving gate in the manner previously outlined.

*Receiving distributor synchronization—Stop-start circuit*

Figure 6:
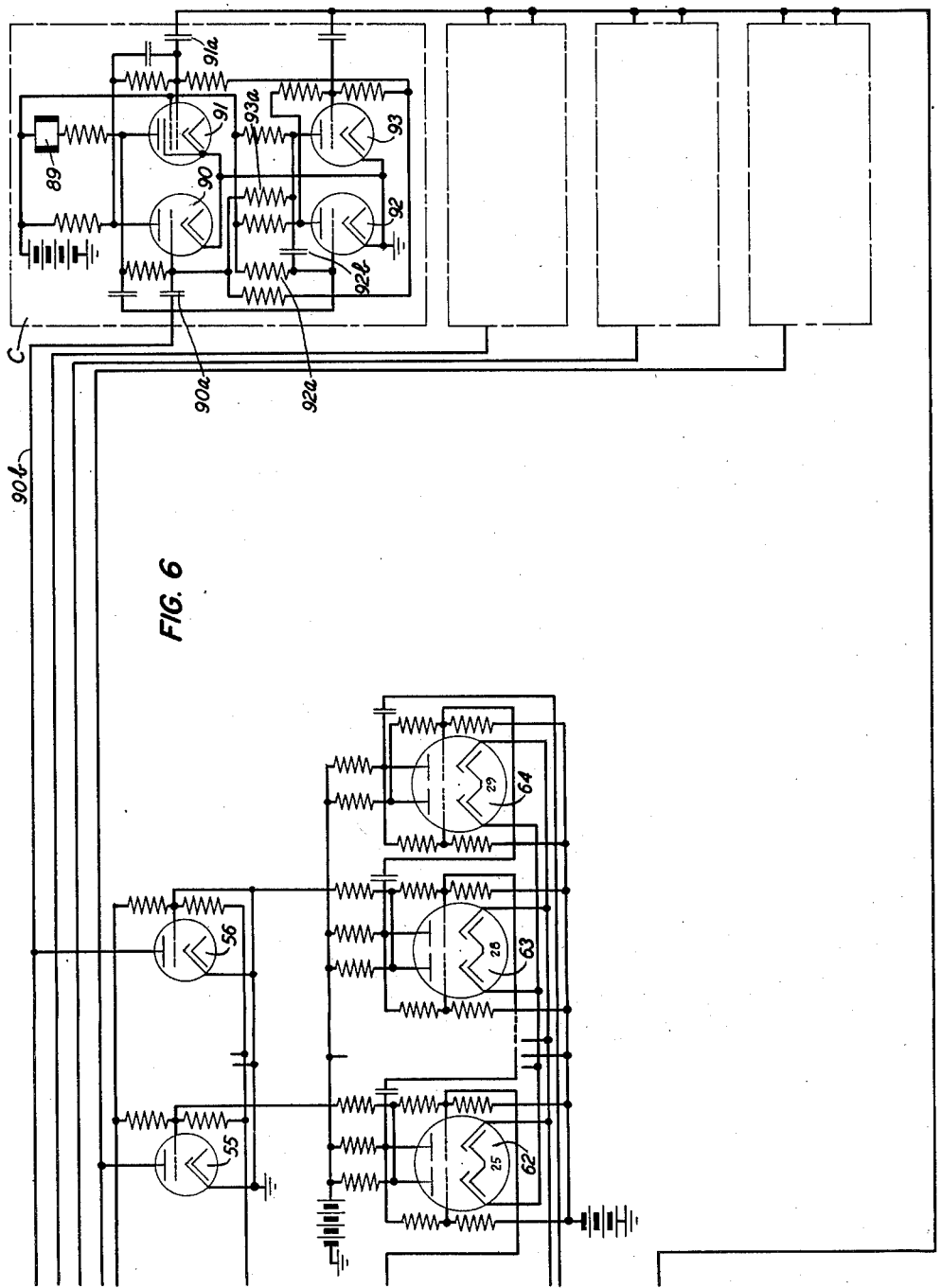

One method of synchronization between the transmitting and receiving distributors is by means of the "start-stop" system. The schematic circuit of such a synchronization system is shown in Figs. 5 and 6, especially within the dotted enclosure A of Fig. 5. As described, the transmitting distributor is arranged so that synchronizing signals are obtained from segments of the transmitting multivibrator ring comprising dual triodes 28 and 29.

It was said that when the transmitting multivibrator ring reaches the segment of dual triode 28, a marking condition is transmitted to the line; the succeeding segment of dual triode 29 achieves a spacing condition. This transition from marking to spacing is used to indicate to the receiver the start of the transmitting distributor cycle as shown in Fig. 11-a. When the mark to space transition reaches the receiver, a short negative pulse is derived from cathode follower amplifier 50 and is differentiated and supplied to the cathode of diode rectifier 65. This negative pulse is differentiated by the R-C network comprising capacitance 75-a and resistance 75-b. The time constant of this network determines the wave shape of the signal transmitted to the cathode of diode 65. The pulse is transmitted through the diode 65 to the grid of multivibrator tube 76-a, and has a wave shape as shown in Fig. 11-b.

Dual triode 76-a and 76-b comprises a multivibrator circuit having two conditions of stability called the "control circuit" wherein left-hand triode 76-a is normally conducting and right-hand triode 76-b is normally non-conducting. Reception of the pulse through the diode rectifier causes triodes 76-a and 76-b to change from static condition becoming respectively non-conducting and conducting. The anode voltage at right-hand triode 76-b will be lowered through the conducting condition as shown in Fig. 11-c; the grid of the oscillator control triode 66 is carried to a more negative potential, beyond cut-off. Prior to the negative swing of the grid of oscillator control tube 66 by triode 76-b the triode 66 is conductive and provides a low impedance shunt across tuned circuit 67, thereby suppressing oscillation. Triode 66 upon being cut off, removes the low impedance shunt and permits the oscillator circuit to begin oscillating, and this circuit will then oscillate as shown in Fig. 11-d as long as the control circuits 76-a and 76-b are in the non-static condition.

Control circuit triodes 76-a and 76-b remain in non-static condition until the receiving multivibrator ring passes through the segment controlled by dual triode 64. Subsequent mark to space transitions received during the distributor cycle will provide negative pulses at the output of rectifier 65 which will no longer affect the grid of 76-a as long as it remains non-conducting. Positive pulses resulting from space to mark transitions will not be transmitted by rectifier 65. These conditions are demonstrated in the representation of the rectifier output 11-b. The marking conditions of the No. 1 segment and spacing condition of the No. 2 segment are chosen arbitrarily. Upon the return of multivibrator ring triode 63 to static condition, all of the various signals transmitted from the tape sensing mechanisms for that given distributor cycle have been received. Dual triode 64 opens the multivibrator ring; its anode is not connected to the control grid of right-hand triode of multivibrator ring tube 57, but instead, its return to static condition provides a pulse to the grid of control tube 76–b. This pulse restores control tubes 76–a and 76–b to static condition, restoring conductivity in oscillator control triode 66 and thereby stopping oscillator 68. The next mark to space transition received from the transmitting distributor, indicating the start of the next distributor cycle, restarts the oscillator 68 in the manner described in the previous paragraph. However, in addition to restarting the oscillator, the mark to space transition and subsequent non-conduction of the left-hand control tube 76–a causes a rise in voltage on the anode of that tube. This rise in voltage is transmitted through a capacitance to the control grid of the right-hand triode of multivibrator ring tube 57. As a result, multivibrator ring tube 57 changes from the static condition, reinitiating the operation of the multivibrator ring until that segment associated with dual triode 64 is reached.

The insertion of the rectifier 65 will prevent space to mark transitions of the line from triggering the operation of the control tubes 76–a and 76–b.

The net result of the stop-start system will be to start the receiving multivibrator ring in one cycle of operation simultaneously with the transmitting multivibrator ring. Receiving multivibrator ring tube 57 thus will not operate until the transmitting distributor proceeds from the multiplex stop signal segment, dual triode 28, to the multiplex start segment, dual triode 29. After the transmitting and receiving distributors are started together, the receiving distributor will stop and wait upon reaching the final segment, dual triode 64, until the next succeeding multiplex stop and multiplex start signals are received.

*Distributor synchronization—Oscillator correction method*

In the description of the oscillator correction method of synchronization, the circuit within dotted enclosure B, Fig. 7, replaces the circuit found within the dotted enclosure A of Fig. 5. This substitution is made in accordance with the terminal designations indicated: a, b, c, d, e, f, g and h.

A local oscillator like the one shown in Fig. 5 and including triode 78 is tuned approximately to the same frequency as the transmitting distributor oscillator by tuned oscillatory circuit 77–a. The amplitude of the wave supplied at the output of this oscillator is controlled by the decrement control 78–a connected between the cathode of oscillator triode 78 and the tuned circuit. Oscillator 78 is coupled through terminal f to the grid of left-hand triode 69, the squaring circuit. The generation of stepping pulses is achieved by the succeeding stages as described in connection with the stop-start synchronizing method.

The mark to space transition received over the line and occurring when the transmitter distributor proceeds from the multiplex stop segment, dual triode 64 to multiplex start segment, dual triode 57, supplies a negative pulse from the cathode of tube 50 through terminal a to the grid of the left-hand triode of synchronization pulse generator 79. The synchronizing pulse generator is a single-vibrator with one condition of stability having its left-hand triode normally conducting by virtue of a positive voltage obtained through resistance 79–a; its right-hand triode is normally non-conducting. The negative pulse makes the left-hand triode non-conducting, the right-hand triode conducting. Single vibrator 79 will return to its static condition a short time after the reception of the negative pulse, as the grid of the left-hand triode will slowly return to a more positive potential by leakage through resistance 79–a. The width of the pulse generated will depend upon the constants of the single vibrator circuit, especially resistance 79–a and capacitance 79–b.

Each mark to space transition received from the cathode follower amplifier 50 provides pulse output from the synchronizing generator 79, including the multiplex stop to start signal received from the transmitter. When the receiving multivibrator ring reaches the segment cooperating with the multiplex stop signal, dual triode 64, the return to static conditions of triodes 64 will adduce a voltage pulse from the anode of the right-hand triode of 64, through terminal d and resistance 80–a, to the control grid of triode 81 in Fig. 7. Triode 81 is a mixing tube having three voltages applied to its control grid: one voltage pulse just described, indicating that the distributor has completed the segment associated with dual triode 64; a second voltage pulse obtained through resistance 80–b each time the synchronizing pulse generator 79 is triggered; and a third voltage, a negative direct-current bias voltage applied through resistance 80–c.

The algebraic sum of these three voltages is such that the addition of the voltage received through resistance 80–a just overcomes the direct-current bias applied through resistance 80–c; the short pulse supplied from the synchronizing pulse generator through resistance 80–b alone is amplified in the mixing triode 81. This phenomenon thus occurs only when the synchronizing pulse combined with the pulse indicating the receiving distributor has reached the final segment. Neither pulse alone has a high enough voltage to overcome the direct-current bias.

Parallel-opposed connected dual diodes 82 and 83 comprise a diode gate circuit. This gate is arranged so that conduction will take place between point 84 and point 85 whenever the pulse obtained from mixing triode 81 is applied to the diode gates through mutually coupled coils 86. Application of the mixing triode pulse through coils 86 applies a positive voltage to the anode of left-hand diode of gate tube 82 and the anode of the right-hand diode of gate tube 83 with respect to the cathode of the right-hand diode of gate tube 82 and the cathode of the left-hand diode of gate tube 83. The right and left-hand diodes of 82 are connected in series across the right-hand winding of coils 86 and the right and left-hand diodes of 83 are similarly connected in series; conduction can therefore take place between points 84 and 85 whenever an output pulse is received from mixing tube 81. A voltage wave is supplied from the oscillator to point 84 through tube 77 and coupling condenser 77–b. Tube 77 has its grid returned to ground and its cathode connected to the tuned circuit of the oscillator so that it operates as a grounded grid or cathode-driven tube. Amplified output from the oscillator is coupled from the resistively loaded plate of triode 77 through condenser 77-b to point 84. If the pulse supplied from the mixing triode 81 occurs at the exact instant that the oscillator output passes through the node or zero point, no voltage will exist at point 84 with respect to ground, and no current will flow through the gate tubes to point 85. If, however, the synchronizing pulse occurs at a time when the oscillator 78 has passed to a negative portion of its sine wave of output, a negative voltage will be developed between point 84 and ground and will be transmitted to point 85, charging the condenser 87 with a given polarity. Similarly, if the synchronizing pulse occurs when the local oscillator is in a positive portion of the sine wave, a positive voltage will be developed between point 84 and ground and will be transmitted through the gate tubes to point 85 charging condenser 87 with an opposite polarity.

The net result will be to provide a no-voltage condition across condenser 87 if the mixing triode and therefor the synchronizing pulse coincides with the transition of the oscillator sine wave through its node or zero position. If the local oscillator sine wave output occurs at a time before or after the synchronizing pulse, a voltage of given polarity will be developed across condenser 87, indicating that the synchronizing pulse does not coincide with the center of the local oscillator frequency.

Pentode 88 comprises a portion of a reactance tube circuit which develops an apparent reactance across the tuned circuit 77-a of the local oscillator whenever a voltage is impressed upon its control grid. Thus, if the oscillator 78 provides an output which lags or leads the synchronizing pulses derived from the transmitting distributor, a corrective voltage will be applied to the control grid of reactance tube 88. In turn, this reactance tube develops a reactance appropriate for the correction of the oscillator frequency, bringing the oscillator back into synchronization.

Since correction of the oscillator occurs only at the time when the synchronizing signal pulse and the final receiving distributor segment coincide at mixing tube 81, the receiving distributor will be corrected as to phase as well as frequency.

The signal received from the anode of the right-hand triode of multivibrator ring tube 64 through terminal d is also supplied through terminal c to the grid of the right-hand triode of multivibrator 57. Thus, the transition to normal of the multiplex stop segment associated with tube 64 not only provides the pulse to operate mixing triode 81, but will also reinitiate the cycle of the receiving multivibrator ring.

Receiver locking circuit

The telegraph printing equipment adapted to transcribe the desired message from the various impulses supplied by the receiving distributor is equipped with a selector magnet. This selector magnet receives the various impulses and translates them to the remainder of the printing equipment. Such selector magnet is completely described in U. S. Patent No. 1,904,164 previously referred to. Because of the selecting time interval control, the various pulses received will be supplied from the distributor to the selecting magnet for only a short period of time; continuity will not exist from one pulse or signal to the next. In order that the selector magnet may remain energized from one pulse or signal as received from the receiving distributor to the next, a locking circuit is required which will cause the selector magnet to remain in the last given position until the succeeding pulse is obtained. For example, when a marking signal is received, the selector magnet will lock in a marking position. When a spacing signal is received, the selector magnet will be released.

Referring to Fig. 6, the selector magnet 89 is shown for one of the four message channels. A typical locking circuit is shown within the dotted enclosure C. When a marking signal is received over line 90-b as a result of the opening of one of the gate tubes, the negative pulse is applied through a capacitance 90-a to the control grid of triode 90. When any one of the gate tubes starts to draw current, indicating a making condition, the various resistances as 51-a in Fig. 5, in series with the anode leads of the gate tubes, cause a voltage drop depressing the anode voltage; a negative pulse will result.

Triode 90 and pentode 91 are connected in a single-vibrator circuit having two conditions of stability; triode 90 is normally conducting and pentode 91 normally non-conducting. The selector magnet 89 is connected in the anode circuit of pentode 91. The negative pulse supplied by the marking condition of the line causes triode 90 to become non-conducting and pentode 91 to become conducting; the resulting anode current of pentode 91 in turn causes the selector magnet to close in the corresponding marking condition.

The negative pulse supplied by the marking line condition is also supplied to the trigger or single vibrator circuit having one condition of stability comprising triodes 92 and 93. The triode 92 is normally conducting and triode 93 is normally non-conducting, the negative pulse triggering this static condition to non-conducting and conducting respectively. The single vibrator comprising 92 and 93 restores itself to the static condition a predetermined period of time after triggering by virtue of the restoration of the positive potential to the control grid of the triode 92 through R-C network 92-a and 92-b. The length of time of the non-static condition is controlled by the values of this R-C network.

The single vibrator comprising triode 90 and pentode 91 is not self-restoring, however, and upon receipt of the negative pulse, indicating a marking condition on line 90-b, remains in the non-static condition until again acted upon. The values of R-C network 92-a and 92-b are so chosen that single vibrator 92 and 93 remains in the non-static condition over a period of time equal to three distributor segments. When this period of time has elapsed, single vibrator 92 and 93 is restored to the static condition. The anode of triode 93 thereupon rises and applies a more positive voltage to the grid of triode 90. Prior to the time that triodes 92 and 93 are restored to static condition, the depression of the anode voltage of triode 93 makes the control grid of triode 90 too negative to conduct, irrespective of the signals applied to it.

The restoration of triodes 92 and 93 to static condition will permit triode 90 to again conduct, but such restoration will not cause triode 90 to conduct; triode 90 is also locked through pentode 91. The pulses obtained with each segment of the receiving distributor from the selecting time interval control triode 72-b are applied to return single vibrator tubes 90 and 91 to static condition. The anode of triode 72-b is connected through capacitance 91-a to the control grid of the pentode 91, and the pulse from the selecting time interval control, with each step of the distributor, will restore the single vibrator 90 and 91 to static condition when the three-segment delay provided by 92 and 93 has elapsed. Restoration of the static condition also unlocks the selector magnet, allowing it to return to spacing condition.

The net result of the operation of the lock will be to operate the selector magnet upon reception of a marking pulse, and hold the selector magnet locked, irrespective of any other condition, until a passage of time equivalent to three distributor segments. During the latter time, these three distributor segments will be supplying intelligence to other printing equipment. Subsequently, the selector magnet is capable of being unlocked and the following pulse received from the selecting time interval control unlocks it.

If at this time the received signal is spacing, no further action takes place and the selecting magnet will remain in the spacing condition. If instead, another marking signal is received, its action will take place immediately upon the unlocking signal of the selector magnet. It will be remembered that the selecting time interval control also controls the opening of the following gate triode; immediately upon release of the selector magnet the succeeding gate will open. As a result if a marking signal is received the circuit parameters of the single vibrator comprising triode 90 and pentode 91 are arranged so that the selector magnet will not have time to release between two consecutive marking signals.

While the description of the system has been given with respect to printing telegraph devices, it will be obvious to those skilled in the art that intelligence signals of many types may be multiplexed and transmitted by apparatus according to the invention.

Although the invention has been illustrated as applied to a particular system, it is, of course, obvious that variations may be made without departing from the spirit and scope of the invention.

What is claimed is:

1. In a multiplex telegraph system, a plurality of permutation code signal sources, a transmitting distributor having a plurality of electronic gate circuits associated with said signal sources for transmitting start, code and stop impulses, a closed electronic counting ring for sequentially activating the gate circuits of the said transmitting distributor, a first electronic oscillator adapted to operate the said counting ring, a receiving distributor having a plurality of electronic gate circuits, a transmission medium coupling said transmitting and receiving distributors, a plurality of telegraph printing devices equal in number to the said plural signal sources, said telegraph printing devices being adapted to receive signals discretely from the said signal sources through the gate circuits of the said transmitting and receiving distributor, an open end electronic counting ring having initial, intermediate and final segments activating the gate circuits of the said receiving distributor, a second electronic oscillator adapted to operate the said second counting ring, means for synchronizing said closed and open end counting rings, said latter means comprising means to derive a synchronizing pulse from the said transmitting distributor through the transmission medium, and means to apply said synchronizing pulse to the initial segment of the said open end electronic counting ring, whereby said counting ring is cyclically energized.

2. In a multiplex telegraph system, according to claim 1, wherein the said second electronic oscillator is rendered operative by said synchronizing pulse.

3. In a multiplex telegraph system according to claim 2, wherein the said second electronic oscillator is rendered inoperative by the final segment of the open end electronic counting ring.

4. In a multiplex telegraph system, a plurality of permutation code signal sources, a transmitting distributor having a plurality of electronic gate circuits associated with said signal sources for transmitting start, code and stop impulses, an electronic counting ring for sequentially activating the gate circuits of the said transmitting distributor, a first electronic oscillator having a given frequency of operation adapted to operate the said counting ring, a receiving distributor having a plurality of electronic gate circuits, a transmission medium coupling said transmitting and receiving distributors, a plurality of telegraph printing devices equal in number to the said plural signal sources, said telegraph printing devices being adapted to receive signals discretely from the said signal sources through the gate circuits of the said transmitting and receiving distributor, a second electronic counting ring having a synchronizing segment and segments activating the gate circuits of the said receiving distributor, a second electronic oscillator having a variable operating frequency output energizing the said second counting ring, means for synchronizing said first and second counting rings, said latter means comprising means to derive a synchronizing pulse from the said transmitting distributor through the transmission medium and from the synchronizing segment of the said second electronic counting ring, and means to control the frequency of the said second electronic oscillator by the said synchronizing pulse whereby said first and second oscillators are synchronized.

5. In a multiplex telegraph system according to claim 4, wherein the means controlling the frequency of the said second electronic oscillator comprises a reactance tube, a synchronizing gate controlling the said reactance tube, and means to supply the said synchronizing pulse and the output of the said second electronic oscillator to the said synchronizing gate, whereby the said synchronizing pulse and frequency of the said second electronic oscillator are collated with respect to time.

6. In a multiplex telegraph system, a plurality of code signal sources having permutations and combinations in accordance with the message material to be transmitted, a transmitting distributor having a plurality of electronic gate circuits associated with said signal sources for transmitting start, code and stop impulses, a first electronic counting ring to open sequentially the gate circuits of the said transmitting distributor, a first electronic oscillator adapted to operate the said counting ring, a receiving distributor having a plurality of electronic gate circuits, a transmission medium coupling said transmitting and receiving distributors, a plurality of telegraph printing devices equal in number to the said plural signal sources, said telegraph printing devices being adapted to receive signals discretely from the said signal sources through the gate circuits of the said transmitting and receiving distributor, a second electronic counting ring connected to permit successive opening of the gate circuits of the said receiving distributor for a given period of time, a time-interval control coupled to the gate circuits of the said receiving distributor to open the latter gate circuits for a period of time less than the given period of permissive opening of the second electronic counting ring, a second electronic oscillator adapted to operate the said second counting ring and the said time-interval control, and means for synchronizing said first and second counting rings.

7. In a multiplex telegraph system, a plurality of code signal sources having permutations and combinations in accordance with the message material to be transmitted, a transmitting distributor having a plurality of electronic gate circuits associated with signal sources for transmitting start, code and stop impulses, a first electronic counting ring to open sequentially the gate circuits of the said transmitting distributor, a first electronic oscillator adapted to operate the said counting ring, a receiving distributor having a plurality of electronic gate circuits, a transmission medium coupling said transmitting and receiving distributors, a second electronic counting ring connected to permit successive opening of the gate circuits of the said receiving distributor for a given period of time, a time-interval control coupled to the gate circuits of the said receiving distributor to open the latter gate circuits for a period of time less than the given period of permissive opening of the second electronic counting ring, a second electronic oscillator adapted to operate the said second counting ring and the said time-interval control, means for synchronizing said first and second counting rings, a plurality of single magnet telegraph printers equal in number to the said plural signal sources, a plurality of locking circuits equal in number to the said plural signal sources to lock for a period of time substantially equal to the time of successive signals received discretely from each of the said signal sources through the gate circuits of the said transmitting and receiving distributors, means to activate said locking circuits by the said time-interval control, and means to couple the said locking circuit to the said telegraph printers.

8. In a multiplex communication system, a plurality of sources of marking and spacing signal groups, each of said groups having discrete elements therein representative of the transmitted subject matter and stop-start signals, a plurality of transmitting thermionic discharge tubes coresponding to each of the discrete elements of the said signal groups and to the stop and start signals of each of the plurality of signal groups, electron multivibrator switching means for rendering the said transmitting thermonic discharge tubes individually and sequentially conducting, a first electronic oscillator activating the said multivibrator means, a transmission medium, means to couple the said plurality of signal groups to one end of the said transmission medium through the said thermionic discharge tubes upon the conduction of the latter, a plurality of receiving thermionic discharge tubes corresponding to the transmitting thermionic discharge tubes and coupled in multiple to the free end of the said transmission medium, a plurality of single magnet telegraph printers corresponding to the plurality of sources of signal groups, a selective coupling of the receiving thermionic discharge tubes cooperating with the discrete elements of the said signal groups to the individual telegraph printers corresponding to the signal groups composed of the said elements, electron multivibrator switching means for rendering the said receiving thermionic discharge tubes individually and successively conducting, a second electronic oscillator activating the second mentioned electron multivibrator switching means, and means to synchronize the said first and second electronic oscillators.

9. In a multiplex system for transmission of a plurality of sources of marking and spacing signal groups having discrete elements thereon representative of the desired subject matter, the combination comprising a plurality of transmitting thermionic discharge tubes corresponding to each of the discrete elements of the said signal groups and to stop and start signals of each of the plurality of signal groups, electron multivibrator switching means for rendering the said transmitting thermionic discharge tubes individually and sequentially conducting, a transmission medium, means to couple the said plurality of signal groups to one end of the said transmission medium individually through the said transmitting thermionic discharge tubes upon the sequential conduction of the latter, a plurality of receiving thermionic discharge tubes corresponding to the transmitting thermionic discharge tubes and coupled in multiple to the free end of the said transmission medium, a plurality of single magnet telegraph printers corresponding to the plurality of sources of signal groups, a selective coupling of the receiving thermionic discharge tubes cooperating with the discrete elements to the telegraph printers corresponding to the signal groups composed of the said elements, electron multivibrator switching means to permit the said receiving thermionic discharge tubes to individually and successively conduct for a given period of time, a time-interval control circuit, means to couple said time-interval control circuit to the said receiving thermionic discharge tubes rendering the latter conductive for a fractional period of the permissive switching time of the second mentioned multivibrator switching means, and means to synchronize the sequential conduction of the said transmitting and receiving thermionic discharge tubes.

10. In a telegraphic communication system for multiplexing a plurality of signal sources over a common transmission medium to a plurality of telegraphic printers including transmitting and receiving electronic distributors, transmitting and receiving multivibrator switching rings providing sequential energization of the respective said distributors and transmitting and receiving sources of periodic voltage to impel the respective said multivibrator switching means, a locking circuit comprising, first and second thermionic discharge tubes coupled in a multivibrator circuit having opposed conditions of conductive stability, means to render the first said thermionic discharge tube non-conductive in accordance with a signal derived by the receiving distributor from one of the plurality of signal sources and to energize one of the said telegraphic printers in accordance with the conductive condition of the said second thermionic discharge tube, and means responsive to signals derived from the receiving distributor subsequent to the said derived signal for rendering the said first thermionic discharge tube conductive and the said second thermionic discharge tube non-conductive in an interval of time substantially equivalent to the elapsed time of the successive signal derived by the receiving distributor from the said one of the plurality of signal sources.

11. In a telegraphic communication system according to claim 10, wherein the means for rendering the said first thermionic discharge tube conductive and the said second thermionic discharge tube non-conductive comprises third and fourth thermionic discharge tubes coupled in a multivibrator circuit having one condition of conductive stability, and means to coerce the said third and fourth thermionic discharge tubes from the said condition of stability in accordance with the first mentioned said derived signal, said multivibrator circuit including a resistance-capacitance network restoring the said third and fourth thermionic discharge tubes to the said one condition of stability having a time constant substantially equivalent to the said interval of time.

12. An electronic telegraph transmitter for multiplexing to a common medium a plurality of signal sources each supplying marking and spacing signal elements comprising, a plurality of thermionic discharge gate tubes having each a cathode, grid and anode, means to apply the said marking and spacing signal elements discretely to the grid-cathode circuits of the said gate tubes, a plurality of pairs of thermionic discharge multivibrator switching tubes, said multivibrator switching tubes having opposed conditions of conductive stability, means to alternate the conditions of stability of the said pairs of multivibrator switching tubes in successive and repetitive steps, means to derive control voltages from the alternate conditions of stability of each of the pairs of the said multivibrator switching tubes, and means to apply the said derived control voltages to the grid-cathode circuits of individual ones of the said plurality of gate tubes, whereby the said gate tubes are opened sequentially to the common medium.

13. In an electronic telegraph transmitter according to claim 12, wherein the means to alternate the conditions of stability of the said multivibrator switching tubes comprise an oscillator having an output frequency equal to the frequency of the successive steps of the said multivibrator switching tubes, means to derive a repetitive square pulse of voltage from the output of the said oscillator, and means to apply the said squared pulse of voltage in multiple to one of each of the said pairs of multivibrator switching tubes.

14. An electronic telegraph receiver for analyzing a plurality of multiplexed signal channels composed of marking and spacing signal pulses, comprising, a plurality of thermionic discharge gate tubes having each a cathode, grid and anode, means to apply the said marking and spacing signal pulses in multiple to the grid-cathode circuit of the said gate tubes, a plurality of pairs of thermionic discharge multivibrator switching tubes, said multivibrator switching tubes having opposed conditions of conductive stability, means to alternate the conditions of stability of the said pairs of multivibrator switching tubes in successive and repetitive steps, means to derive control voltages from the alternate conditions of stability of each of the pairs of the said multivibrator switching tubes, a plurality of telegraph printers, means to couple the anode-cathode circuits of the gate tubes to the said plurality of telegraph printers in discrete groups corresponding to the signal channels, and means to apply the said derived control voltages to the grid-cathode circuits of individual ones of the said plurality of gate tubes whereby the said gate tubes are opened sequentially to the said printers.

15. In an electronic telegraph receiver according to claim 14, wherein the means to alternate the conditions of stability of the said multivibrator switching tubes comprise an oscillator having an output frequency equal to the frequency of the successive steps of the said multivibrator switching tubes, means to derive a repetitive square pulse of voltage from the output of the said oscillator, and means to apply the said squared pulse of voltage in multiple to one of each of the said pairs of multivibrator switching tubes.

16. In an electronic telegraph receiver according to claim 14, wherein a receiver synchronizing pulse is received from a portion of the plurality of multiplexed signal channels, the circuit comprising means to derive a second control voltage from the alternate conditions of stability of one of the said pairs of multivibrator switching tubes, and means to control the operation of the said oscillator in accordance with a collation of the receiver synchronizing pulse and the said derived second control channel.

17. In a system for multiplexing a plurality of start-stop telegraph channels, a transmitting distributor having a segment for the start, code and stop signal elements of each of said channels and an additional start segment and an additional stop segment, a transmission medium, means for effectively connecting said segments in succession to said transmission medium, a remote receiving distributor having a segment for start, code and stop signal elements of each of said channels, a plurality of telegraph recorders equal in number to said channels, connections from each of said recorders to the segments of the channel corresponding to the recorder, means responsive to a signal pulse from the additional start segment of said transmitting distributor for initiating operation of said receiving distributor, and means responsive to the additional stop segment of said transmitting distributor for arresting said receiving distributor.

ALLAN WEAVER.

REFERENCES CITED

The following references are of record in the file of this patent:

UNITED STATES PATENTS

| Number | Name | Date |
|---|---|---|
| 1,799,627 | Knoop | Apr. 7, 1931 |
| 2,052,539 | Frischknecht | Aug. 25, 1936 |
| 2,339,682 | Cox | Jan. 18, 1944 |
| 2,365,450 | Bliss | Dec. 19, 1944 |
| 2,575,268 | Griffith | Nov. 13, 1951 |

FOREIGN PATENTS

| Number | Country | Date |
|---|---|---|
| 613,084 | Great Britain | Nov. 22, 1948 |